United States Patent [19]

Stock et al.

[11] Patent Number: 4,572,710
[45] Date of Patent: Feb. 25, 1986

[54] METHOD AND APPARATUS FOR CHANGING FILTERS IN NUCLEAR POWER STATIONS

[75] Inventors: Arthur J. Stock, Stuart, Fla.; Donald E. Christofer, Mentor, Ohio; John C. Homer; Robert J. Torok, both of Chardon, Ohio; Thomas Whittington, Mentor-on-the-Lake, Ohio

[73] Assignee: General Signal Corporation, Stamford, Conn.

[21] Appl. No.: 388,109

[22] Filed: Jun. 14, 1982

[51] Int. Cl.⁴ ............................................. G21C 19/00
[52] U.S. Cl. ..................... 414/146; 414/609; 414/164; 414/591; 210/237; 376/260
[58] Field of Search ............ 414/744 R, 744 A, 744 B, 414/744 C, 589, 590, 591, 222, 225, 226, 164, 146, 564, 609; 376/260, 262, 313; 210/237

[56] References Cited

U.S. PATENT DOCUMENTS

| | | | |
|---|---|---|---|
| 3,941,259 | 3/1976 | Hoffmeister et al. | 376/262 |
| 4,047,555 | 9/1977 | Lamarque | 414/744 A X |
| 4,158,600 | 6/1979 | Akimoto et al. | 376/260 |
| 4,353,675 | 10/1982 | Risener et al. | 414/744 A X |

*Primary Examiner*—Joseph E. Valenza
*Assistant Examiner*—Dennis Williamson
*Attorney, Agent, or Firm*—Pearne, Gordon, Sessions, McCoy, Granger & Tilberry

[57] ABSTRACT

A remote control apparatus for removing from one of a number of filter pits, and loading for protective storage in a disposal drum, radioactive filters used in nuclear power generating stations, and for replacing spent filters. The apparatus includes a transportable base adapted to be placed adjacent the respective filter pit and a hoist mechanism mounted on the base. The hoist mechanism includes a vertical tower or mast mounted on the base, a generally horizontal boom mounted on and extending outwardly from the top of the mast, a grab mechanism for engaging various specially adapted articles, including spent filters to be removed and new filters for replacement, means for operating the grab mechanism from a remote location, a lift mechanism for supporting the grab mechanism from the outer end of the boom and for raising and lowering it in a vertical path, and means for operating the lift mechanism from the remote location. A drum turret is mounted on the base for rotary movement about a vertical axis spaced from the vertical path, to and from a filter receiving position wherein a storage drum carried thereby is placed in the aforesaid vertical path to receive a removed filter to be lowered therein by the lift mechanism. The drum turret is adapted to be operated from a remote location. A second turret is mounted on the mast intermediate the base and the boom for rotary movement about the aforesaid vertical axis and has preferably two radially extending platforms adapted to be positioned selectively in alignment with the vertical path of travel to receive from or locate for the grab means a spent or new filter or other article to be supported by the second turret. The second turret is also adapted to be operated from a remote shielded location.

10 Claims, 18 Drawing Figures

METHOD AND APPARATUS FOR CHANGING FILTERS IN NUCLEAR POWER STATIONS

BACKGROUND OF THE INVENTION

This invention relates to apparatus and methods for the handling of radioactive material, and especially to the loading, removal, and replacement of filters used in nuclear power generating stations to remove radioactive impurities in the primary and secondary water systems.

More particularly, the invention relates to an apparatus capable of control from a remote station and of performing all of the procedures required for changing a filter and for loading the spent radioactive filter in a shielded container for disposal.

In a nuclear power plant, a coolant is circulated around the core of the reactor as a heat transfer medium that transfers the heat generated in the reactor to apparatus wherein the heat may be further transferred and/or extracted. Coolant branch circuits are provided, and they are utilized for many purposes, such as coolant volume control, coolant water chemistry control, reactivity control, etc. The reactive coolant system, its associated branch circuits (commonly known as auxiliary process systems) and their related components comprise a major portion of the fluid system of a nuclear power plant or other nuclear reactor installation.

During operation of a nuclear reactor or other source of radioactivity, particles of foreign matter resulting from corrosion of the coolant and auxiliary process piping become entrained in the coolant and circulate therewith around the core of the reactor and through the associated cooling and process equipment and piping. As the particles flow around the source of radioactivity, they become radioactive and tend to accumulate at various locations in the piping systems and emit radioactive energy. Depending upon the shielding associated with the piping system, the radiation from the accumulated particles tends to create health hazards for personnel working in and about the radioactive fluid systems and/or associated components.

In order to control the quantity of foreign matter flowing in the cooling and process systems, nuclear power plants and other installations are provided with filters to collect the radioactive particles for removal from the coolant and process systems. Some conventional filter housings employed to capture radioactive particles have a top hatch permitting installation and removal of a filter cartridge from above. The particle-laden cartridge is usually placed in a shielded shipping container for ultimate disposal.

The most common filtering equipment in use today employs disposable filter cartridges that entrap the radioactive solids during the course of the filtering action. Such filter cartridges must be replaced periodically.

The filter cartridge is usually located in a filter pit below the floor of the power plant, and covered with a shield plug forming part of the floor. Since the filter cartridges become highly radioactive during use, they are located within shielded rooms having walls with a thickness of several feet on all sides. Removal of the spent cartridge begins with removal of the shield plug, using an overhead hoist or the like, laying the shield plug aside, and exposing the filter assembly beneath the floor. The operator must remain behind a shield wall to prevent overexposure to the radiation yielded by the assembly. Once the filter pit is opened, a shielded drum or transfer cask is positioned adjacent the pit and a cartridge-grappling tool or the like is lowered in place to grasp the filter cartridge. The cartridge is then withdrawn and placed in the drum or transfer cask. Upon verification that the cartridge is in the transfer cask, the cask is removed from its position adjacent the access opening and transferred to a disposal area.

It can be appreciated that the removal and reloading of filters is very hazardous and great care must be taken to protect the operator. The method and apparatus of the present invention resolve many of the difficulties mentioned above and afford other features and advantages heretofore not obtainable.

SUMMARY OF THE INVENTION

It is among the objects of the invention to provide a more reliable method and apparatus for removing, storing for disposal, and replacing filter cartridges used in nuclear power stations.

Another object is to reduce the difficulties that arise in handling radioactive filter cartridges that must be removed and disposed of in nuclear power generating stations.

These and other objects and advantages are achieved by the novel method and apparatus of the invention, which relates to the removing and replacing of filter cartridges of the type located in shielded filter pits for processing waste water in nuclear power generating stations. The apparatus of the invention includes a base adapted to be located adjacent the recess or filter pit in which a filter cartridge is placed and a hoist means mounted on the base. The hoist means includes a generally vertical mast, a generally horizontal boom extending outward from the top of the mast, a grab means for engaging shield plugs or filters to be transported to and from a filter receiver or disposal drum, means for operating the grab from a remote location, lift means for supporting the grab from the boom and for raising and lowering the grab in a vertical path, and means for operating the lift means from a remote location.

The apparatus also includes a drum turret mounted on the base for rotary movement relative to the base about a vertical axis spaced from the aforementioned vertical path to and from a position wherein a storage cask or drum carried by the turret is placed in the vertical path, and means for operating the drum turret from a remote location. The apparatus also includes a second turret mounted on the mast between the base and the boom for horizontal movement about the same vertical axis as the drum turret. The second turret has at least one radially extending arm adapted to be moved to and from a position aligned with the vertical path of travel.

In accordance with the method of the invention, an apparatus of the type defined above is operated to perform the following steps:

(1) placing a disposal drum on the drum turret;

(2) locating the apparatus in operating position adjacent a filter pit;

(3) operating the lift means to lower the grab, grip the stepped shield plug over the filter pit, and raise the plug to a full up position;

(4) rotating the second turret to a position with one of the arms beneath the grab;

(5) operating the lift means to lower the grab, place the plug on the arm, release the plug, and raise the grab to its full up position;

(6) rotating the second turret to its intermediate position;

(7) operating the lift means to lower the grab, grip the spent filter and raise it to a full up position;

(8) rotating the drum turret to place the drum beneath the spent filter;

(9) operating the lift means to lower the grab with the spent filter into the drum, release the filter, and raise the grab to its full up position;

(10) rotating the drum turret to move the drum to a clearance location;

(11) rotating the second turret to place a new filter in the vertical path;

(12) operating the lift means to lower the grab, grip the new filter, and raise the new filter to its full up position;

(13) rotating the second turret to its intermediate position;

(14) operating the lift means to lower the new filter into the filter housing, releasing and raising the grab to its full up position;

(15) rotating the second turret to a position with the shield plug beneath the grab;

(16) operating the lift means to lower the grab into engagement with the shield plug and raising the shield plug to its full up position;

(17) rotating the second turret to its intermediate position; and (18) lowering the stepped shield plug into its position on the filter pit, releasing the shield plug and raising the grab to its full up position.

BRIEF DESCRIPTION OF THE DRAWINGS

In the drawings:

FIGS. 1 through 7 are fragmentary, perspective views, with parts broken away, illustrating several of the sequential operating steps of the method of the invention;

FIG. 8 is a plan view of the filter changing machine of FIGS. 1 through 7;

FIG. 9 is a fragmentary, sectional view on an enlarged scale, taken from the line 9—9 of FIG. 8, with parts broken away for the purpose of illustration and showing the drum table turned to place a drum carried thereby at the capping station adjacent the drum capping assembly;

FIGS. 13a and 13b are fragmentary, sectional views on an enlarged scale, taken on the line 13—13 of FIG. 12;

FIG. 14 is a fragmentary, elevational view on an enlarged scale, with parts broken away and shown in section, showing the drum capper assembly and taken on the line 14—14 of FIG. 8;

FIG. 16 is a fragmentary, elevational view, with parts broken away, taken on the line 16—16 of FIG. 15; and FIG. 17 is a fragmentary, sectional view, taken on the line 17—17 of FIG. 16.

DESCRIPTION OF THE PREFERRED EMBODIMENT

Referring more particularly to the drawings, and initially to FIGS. 1 through 7, there is shown a machine A for handling filters F of the type used in nuclear power generating stations for the purpose of filtering radioactive particles from the various water systems as generally described above. The machine A is adapted to receive a drum D in which a spent filter F' is to be loaded for disposal, and to travel with the drum D to a predetermined position adjacent a filter pit containing the filter F' to be removed. The drum D has been partially filled (or lined) with cement to form a shielded cavity within of a size to receive a spent filter F'. The machine A is adapted to remove and replace a drum shield plug P from the drum D and a shield plug from the top of the filter pit and then remove the spent filter F' from the pit and place it in the prelined drum D. Then, the machine loads a new filter F into the filter pit and replaces the shield plug.

The machine includes as its principal components a carriage 10 that supports a pivoting drum table 30 and a rotatable mast 40, both of which turn about the ram vertical axis. The mast 40 has an outwardly extending boom 45 at the top thereof and the mast and boom support a hoist mechanism 50 adapted to engage the filters F and F', as well as the closure plug P and the shield plug described above. A filter turret 70 is mounted on the mast 40 between the carriage 10 and the boom 45, and is rotatable to place its radially extending arms into and out of vertical alignment with the path of travel of the hoist mechanism 50. A drum capper assembly 100 is adapted to complete the closing of the drum D after it is positioned for capping in the drum turret 30 by placing a conventional lid L and clamp ring C on the loaded drum D prior to its removal from the machine A for completion of the disposal process.

The carriage 10, shown in best detail in FIGS. 8, 9, 13a and 13b, comprises a platform 11 formed of welded steel plate and having a rectangular configuration. The carriage 10 moves on four flanged wheels 12 that ride on parallel rails 13. The rails 13 are located parallel to one or more rows of filter pits so as to carry the machine A along a path of travel sufficient to place the machine in proper relationship to any one of the filter pits from which a spent filter F' is to be removed.

In the embodiment shown, two rows of filter pits are used, and the rails 13 span both of the rows so that two filter pits can be serviced from one particular location of the carriage. The carriage 10 is propelled by a motor 14 that is coupled to axles that drive one pair of wheels 12.

A pair of openings 15, 16 are formed in the forward end of the platform 11 and are located so as to be capable of alignment with adjacent filter pits 17 and 18 of two parallel rows. The filter pits 17 and 18 each have a stepped shield plug 19 removable by the machine A and which completes the shielding of the filter F that collects the radioactive particles.

Mounted on the platform 11 approximately in the center is a turntable 20 adapted to rotate about a central vertical axis. The turntable 20, best shown in FIGS. 13a and 13b, has an annular base plate 21 bolted to a bearing ring 22 by bolts 23. The bearing ring 22 is supported by a fixed bearing ring 24 bolted to the platform 11 by bolts 25. The fixed bearing ring 24 has external gear teeth formed thereon that are engaged by a pinion 27 driven by either or both of two motors 28 and 28' mounted on the base plate 21 and driven through a reduction gear unit 29.

Figure 12:
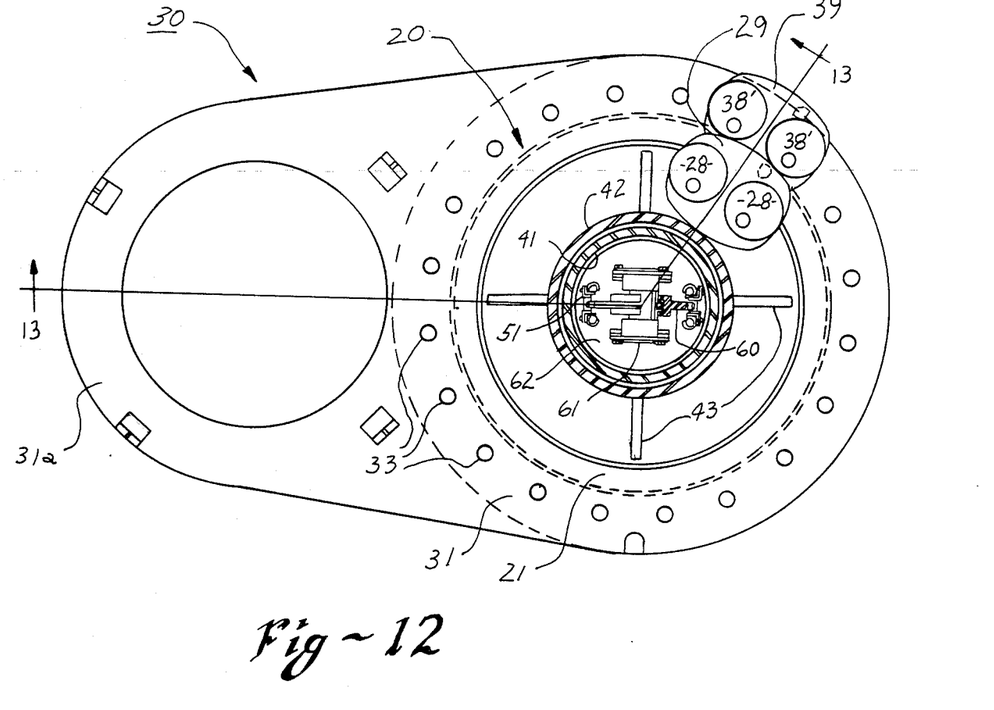
FIG. 12 is a sectional view on an enlargd scale, taken on the line 12—12 of FIG. 10.
Figure 13B:
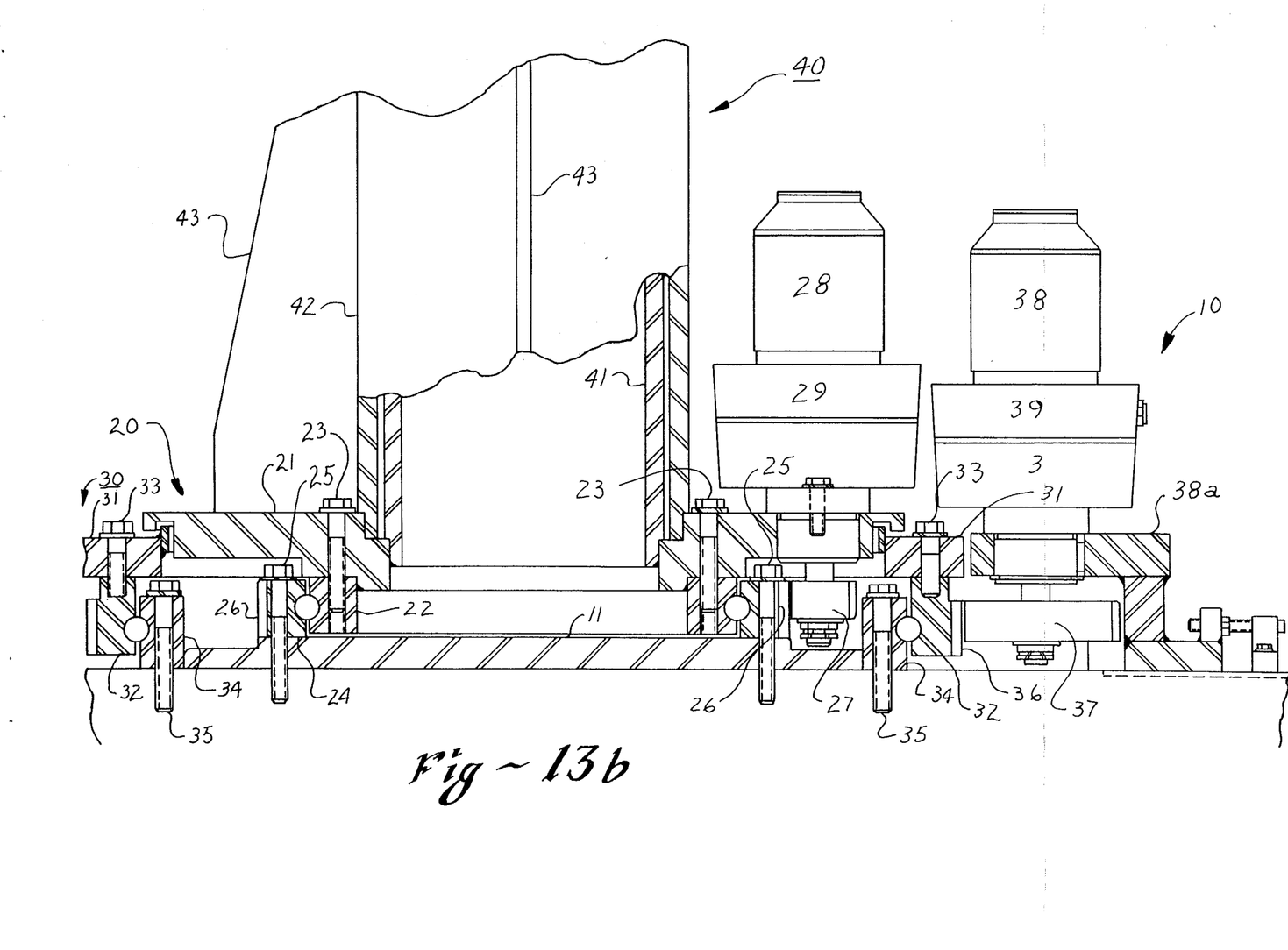
Figure 15:
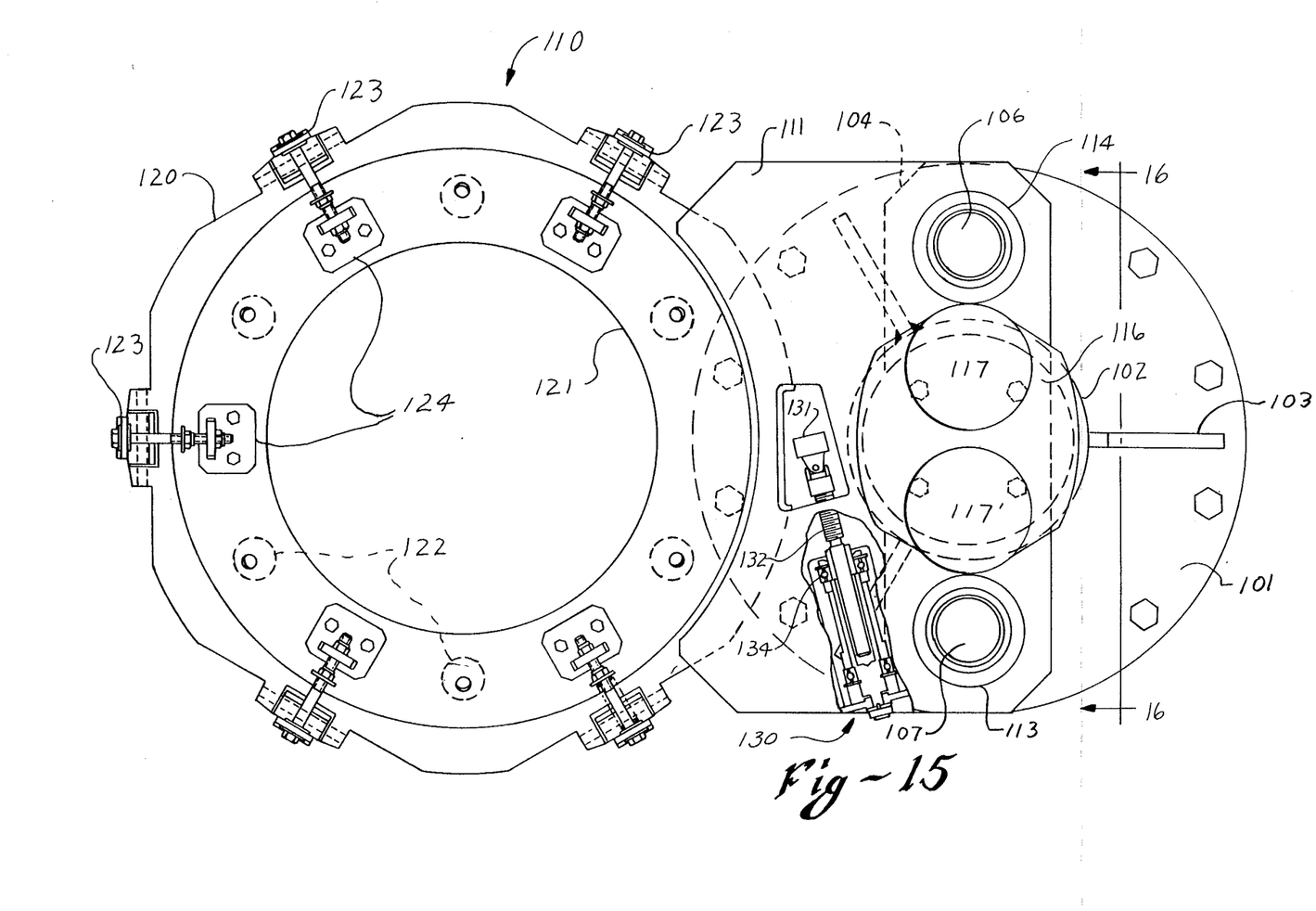
FIG. 15 is a plan view of the drum capper assembly.

Also mounted on the platform 11 is a drum table 30 adapted to move a disposal drum D between various positions during the filter changing procedure. The drum table 30, best shown in FIGS. 12, 13a and 13b, has an annular base plate 31 with a radial extension 31d that supports a drum D. The annular base plate 31 is bolted to a bearing ring 32 with bolts 33. The bearing ring 32 is supported by a fixed bearing ring 34 that is bolted to the platform 11 with bolts 35. The bearing ring 32 is provided with external gear teeth 36 that are engaged by a pinion 37 that turns the annular base plate 31. The pinion 37 is driven by either or both of two motors 38 and 38' through a reduction gear unit 39. The motors 38 and 38' are mounted on a bracket 38a attached to the platform 11.

The mast 40 is mounted on the turntable assembly 20—more specifically on the annular base plate 21—and extends upwardly high enough to support the boom 45 at a height adequate to provide clearance for accomplishing the various movements utilized in the filter changing operation. The mast 40, best shown in FIG. 10, comprises a tubular, cylindrical inner member 41 welded to the annular base plate 21 and an outer, annular, cylindrical member 42 mounted coaxial with and surrounding the inner member 41. The outer member 42 is also welded to the annular base plate 21, but extends upwardly only about half the height of the inner member 41.

The member 42 is adapted to support the filter turret 70 and is braced by gussets 43 that extend radially outward and are welded to the annular base plate 31.

The upper end of the inner member 41 has a radial flange 44 to which the boom 45 is bolted. Also, the boom 45 is braced by a gusset 46.

It will be seen that the mast 40 and boom 45 turn with the turntable assembly 20 to position the hoist assembly 50 at positions over either of the filter pits 17 and 18. Accordingly, the range of motion of the turntable assembly 20 is an arc extending between the openings 15 and 16 in the platform 11. Normally, the turntable assembly 20 is not moved during a filter changing procedure once its position is initially selected.

The boom 45 extends radially outward from the top of the mast 40 and comprises steel plates welded together to form a boxlike structure capable of enclosing portions of the hoist mechanism 50 and of providing sufficient strength to support the suspended components during the various operations performed in the filter changing process.

Figure 10:
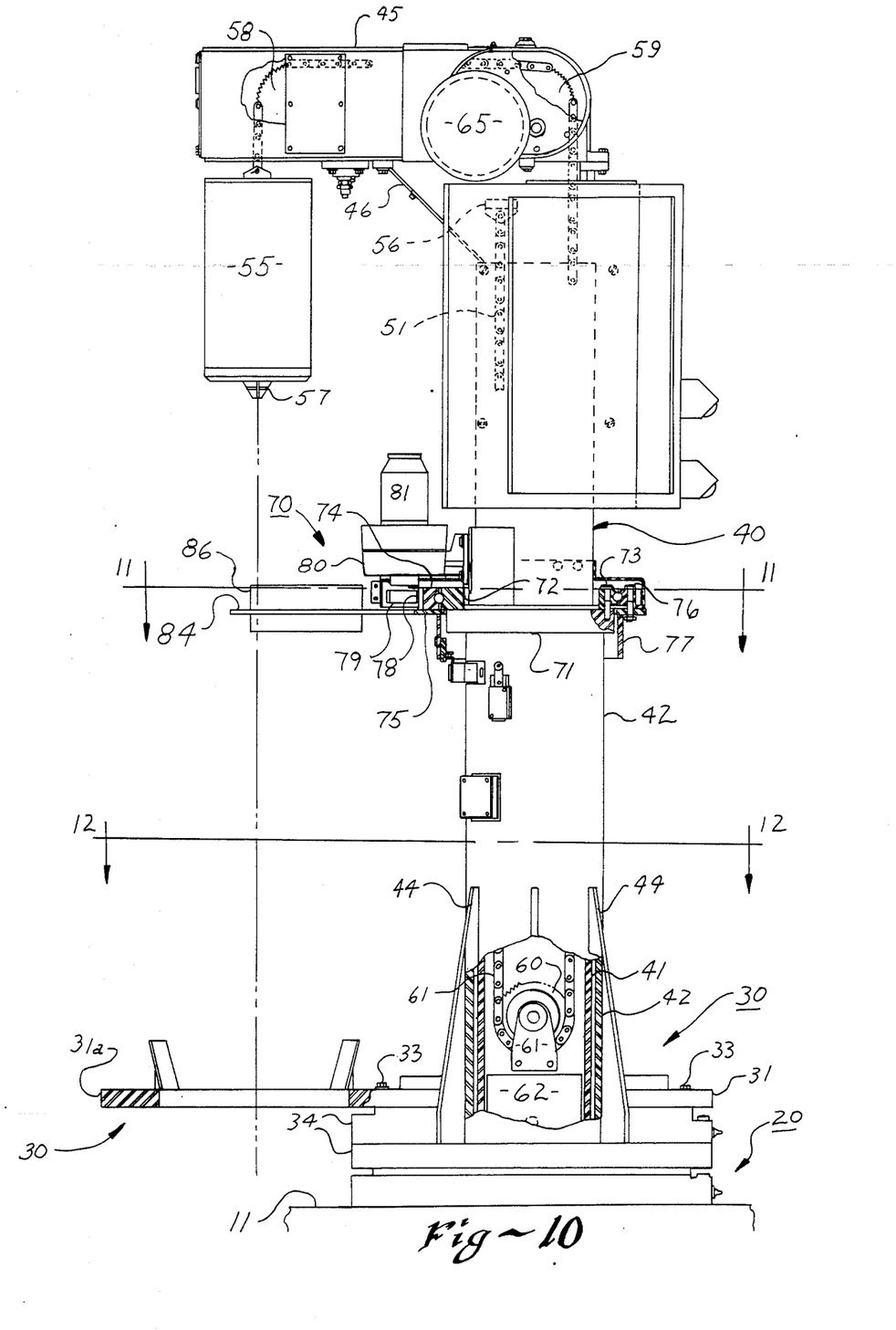
FIG. 10 is a sectional view on an enlarged scale, taken on the line 10—10 of FIG. 8, with parts broken away for the purpose of illustration.

The hoist mechanism 50, best shown in FIG. 10, comprises a length of roller chain 51 that supports a grab 55 at one end and is anchored to a bracket 56 inside the mast 40 at the other end. The grab 55 has a collet 57 that is moved between a gripping and releasing position by a motor (not shown).

The roller chain 51 extends upwardly from the grab 55 to an idler sprocket 58 journaled adjacent the end of the boom 45 and then rearwardly to a drive sprocket 59 mounted at the inner end of the boom 45. From the drive sprocket 59, the chain 51 extends downwardly through the cylindrical space within the mast 40 to another idler sprocket 60 journaled on a bracket 61 mounted on a counterbalance block 62 that is adapted to move vertically within the tubular inner member 41 of the mast 40. From the idler sprocket 60, the roller chain extends upwardly to the bracket 56 at the top of the mast 40.

It will be seen that the counterbalance block 62 will move in the opposite direction from the movement of the grab 55, but that the grab will move a distance twice the distance that the counterbalance block 62 moves due to the arrangement of the chain and sprocket mechanism.

The drive sprocket 59 is driven through a gear box 63 by either or both of two drive motors 64 and 64'. As in the case of most of the operating equipment in the filter removal machine A, two drive motors are provided in order to have a redundancy in the event of failure of one of the motors.

The hoist mechanism 50 is operable to raise and lower the grab 55 and articles gripped thereby through a vertical path of travel that extends from a lower limit low enough to engage a spent filter cartridge F' in a filter pit 19 to an upper limit shown in FIG. 10 sufficient to support the article engaged and suspended by the grab 55 high enough above the filter turret 70 to permit clearance between the turret and the article supported.

Figure 11:
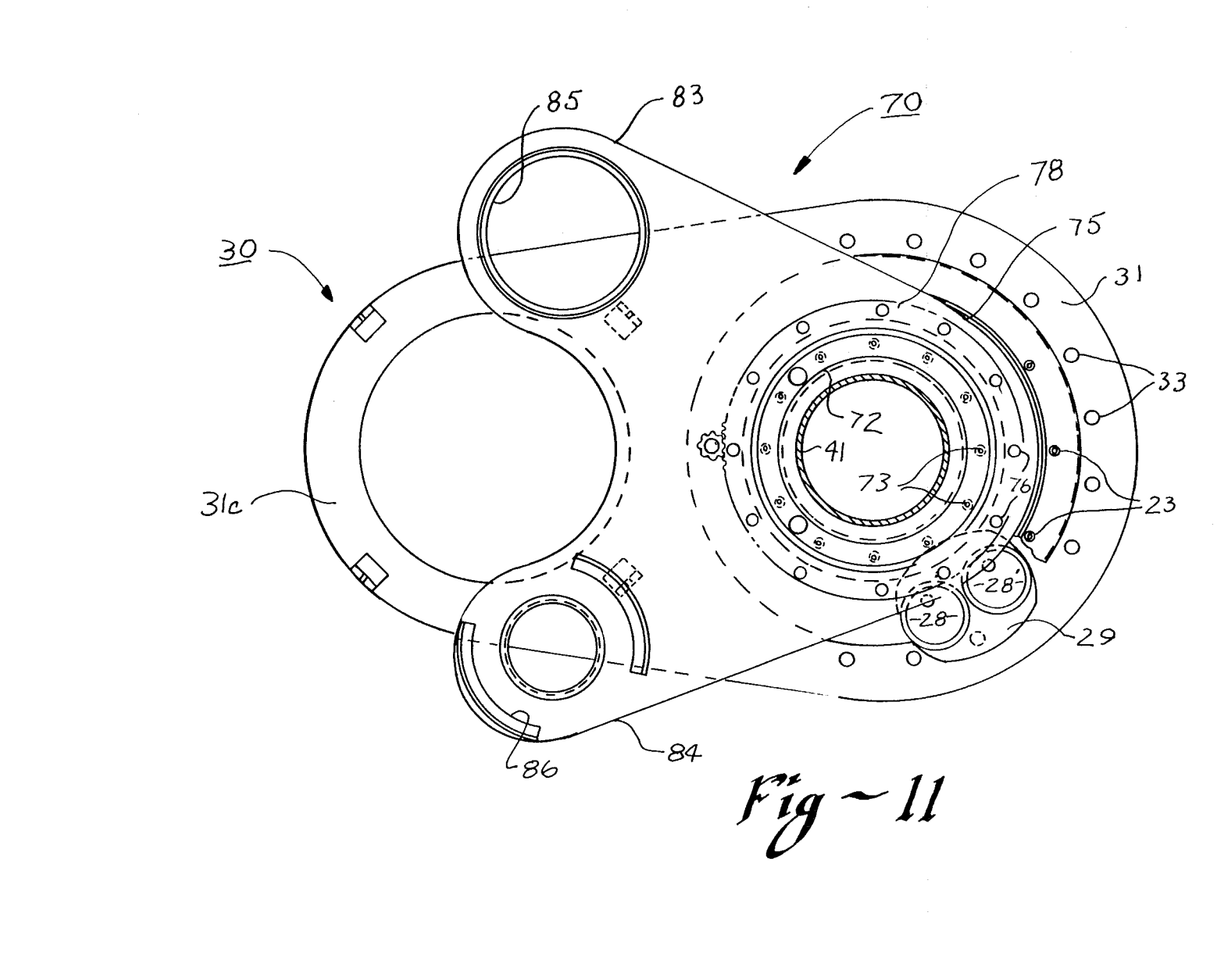
FIG. 11 is a sectional view on an enlargd scale, taken on the line 11—11 of FIG. 10.

The filter turret 70, best shown in FIGS. 10 and 11, is supported on an annular flange 71 welded to the top of the tubular, cylindrical outer member 42 of the mast 40. A fixed bearing ring 72 is bolted to the flange 71 with bolts 73. The fixed bearing ring 72 is operatively associated with a rotary bearing ring 74 that supports a turret plate 75 bolted thereto with bolts 76. An annular rim 77 is welded to the bottom of the plate 75 to partially enclose the operating mechanism and to provide a mount for limit switches and cams used in the control system. The bearing ring 74 has external gear teeth 78 that are engaged by a pinion 79 driven through a reduction gear unit 80 by either or both of two drive motors 81 and 81'. Here again, two motors are provided to achieve a redundancy in the event one motor fails.

Figure 5:
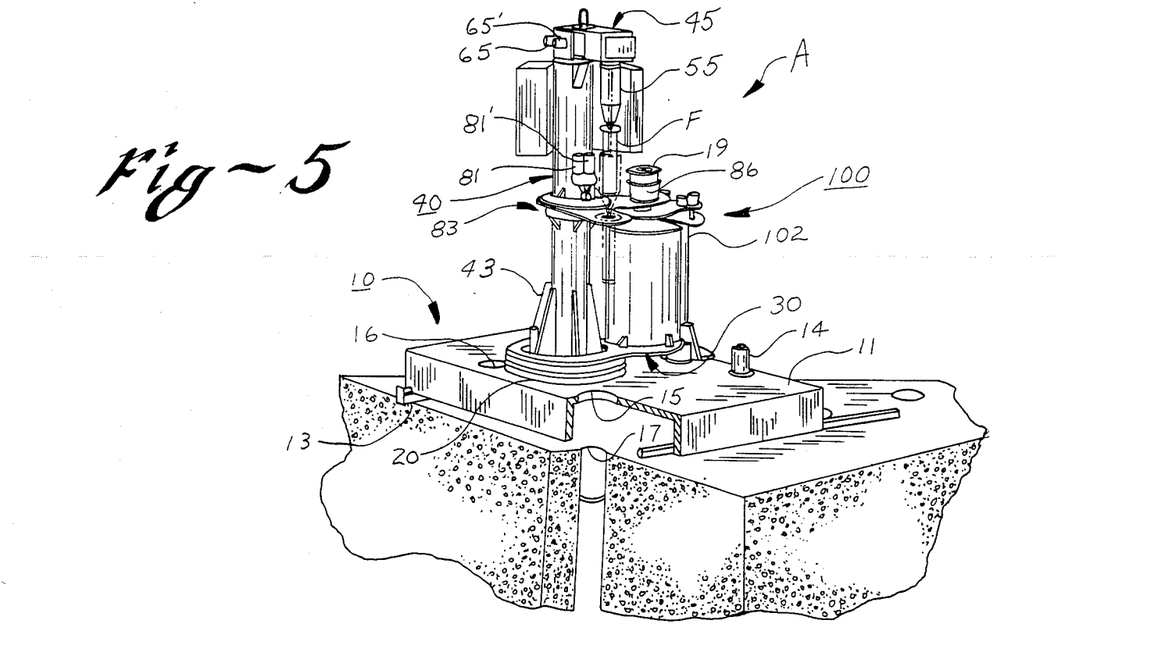
Figure 6:
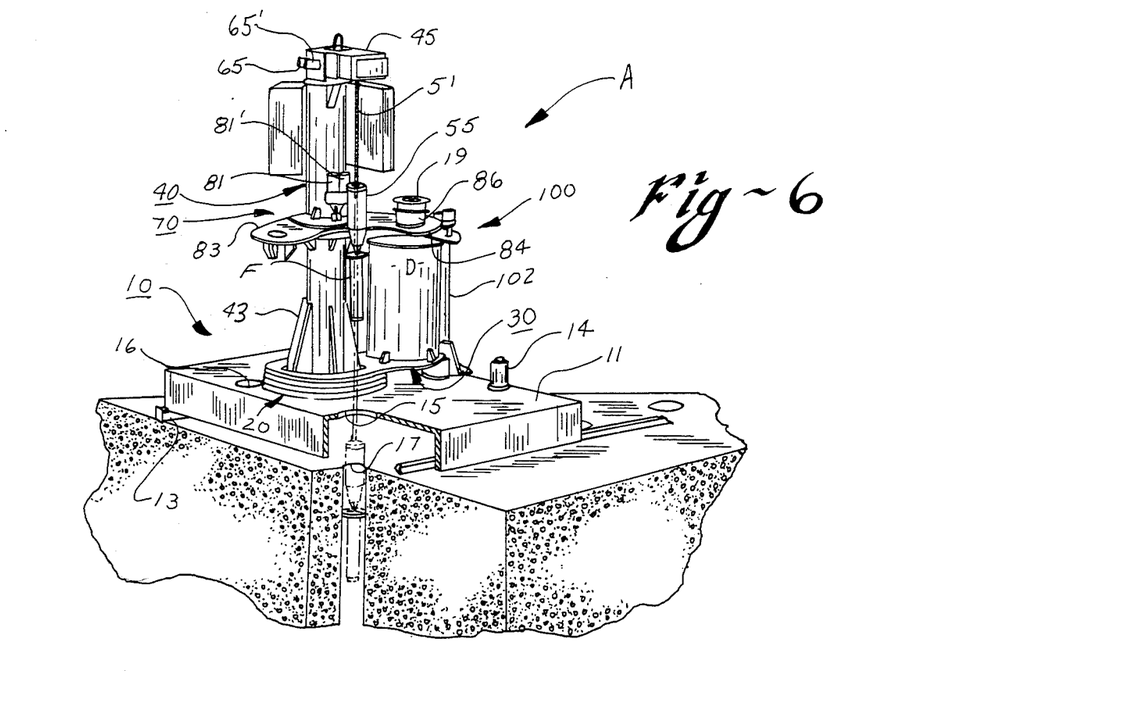

The turret plate 75 has two radially extending arms, including a filter arm 83 and a plug arm 84. The arms 83 and 84 extend radially outwardly and are adapted to turn between a neutral position illustrated in FIGS. 1, 3, 4, 6, 7, 8, and 11 to a position wherein one of the arms is located immediately over the filter pit to be serviced, or, in other words, directly in the vertical path of travel of the grab 55 (FIGS. 2 and 5). The arm 83 has a circular opening 85 adapted to receive a replacement filter cartridge F and drum shield plug P and support the cartridge by its radial rim at the upper end thereof. The arm 84 is provided with a receptacle 86 adapted to receive the stepped shield plug 19.

The drum capper assembly 100 is best shown in FIGS. 9, 14, 15, 16, and 17, and is adapted to perform the function of securing a lid L on the drum D once a spent filter F' has been placed in the drum and the drum shield plug P placed in position. The assembly is adapted to hold a drum lid L and a clamp ring C in position so that when the drum D is placed beneath the lid L and clamp ring C as shown in FIGS. 5 and 9, the lid and clamp ring can be lowered into position and secured to the top of the drum.

The assembly comprises a fixed base 101 mounted on the platform 11 of the carriage 10. The base supports an upright tubular stand or post 102 that is welded to the base 101 and braced with radially extending gussets 103. A mounting plate 104 is welded to the top of the post 102 and supports a pair of vertical guide pins 106 and 107 that extend upwardly from bearing blocks 108 and 109 that are welded in position in openings in the mounting plate 104.

Located above the vertical stand 102 is a capping fixture 110 supported for reciprocating vertical movement by the mounting plate 104. The capping fixture includes a main plate 111 with a pair of laterally spaced, vertical guide sleeves 113 and 114 positioned to receive the guide pins 106 and 107 so as to guide the vertical movement of the capping fixture 110.

Centrally mounted in the main plate 111 is a lead screw 115 with threads that engage internal threads of a nut 112 mounted on the cross plate 104. The lead screw 115 is rotated through a reduction gear unit 116 mounted on the main plate 111, the reduction gear unit 116 being driven by either or both of two drive motors 117 and 117'. Here again, two drive motors are provided to achieve redundancy in the event one motor fails. A support rim 120 is welded to the bottom side of the main plate 111, and has an annular plate 112 secured therein. The annular plate 121 supports six circumferentially spaced magnets 122 that are used to support a drum lid L to be secured to the drum D.

The support rim 120 also has five adjustable ring retainers 123 located at circumferentially spaced locations and adapted to support the clamping ring C used to secure the lid L to the drum D. The rim retainers 123 are supported in brackets 124.

A pair of cam switches 125 and 126, actuatable upon lowering of the capping fixture 110, are mounted on the cross plate 104 and are actuated by cam operators 127 and 128 secured to the main plate 111. The switches 125 and 126 form part of the control system for the apparatus.

A clamping assembly 130 is located beneath the main plate 111 and is adapted to tighten the clamping ring C around the drum lid L and the rim of the drum D in order to tightly seal the lid in position. The clamping assembly 130 includes a head 131 attached to a rod 132, the head being adapted to engage the clamp ring C. The rod 132 has external threads that engage the internal threads of an operating nut 134 driven from a gear unit 135 by either or both of two electrical drive motors 137 and 137'. The rod 132 reciprocates through a range of travel of about three inches in a direction tangential to the clamping ring.

OPERATION

The operation of the filter changing machine A of the invention is best illustrated in FIGS. 1 through 7.

Initially, the machine A is located in the working space at a position to receive a prelined drum D that is transported with other equipment such as an overhead traveling bridge crane. The drum turret 30 is first rotated to a position wherein sufficient vertical clearance is provided to lower the drum D onto the extension 31d. When the drum is in position, the clamping ring C and drum lid L are removed from the drum and loaded into the capping fixture 110 of the drum capper assembly 100, as shown in FIG. 14. At this point, the new filter F is loaded in the filter arm 83 of the filter turret 70. Also, a drum shield plug P is placed in the top of the drum D.

These initial steps are accomplished manually, and after completion the workmen loosen the retaining screws over the stepped shield plug 19 for the filter pits 17 or 18 to be serviced, and then move to remote shielded locations to avoid exposure to radiation. Then, the filter removal machine A is moved along the rails 13 by operating the motor 14 to a position for servicing the filter pit containing the spent filter F' to be removed. This is a predetermined position that is assumed by the carriage 10 in response to operation of suitable limit switches located, for example, on one or both of the rails 13.

When the machine is at this position, the drum table 30 is operated to bring the drum D in alignment with the vertical path of operation of the grab 55. Then, the hoist mechanism 50 is operated using the drive motors 65 and 54' to lower the grab 55 into engagement with the closure plug P in the prelined drum D. The drum shield plug P is then lifted clear of the drum, the drum table 30 is operated to move the drum from the operating path, and the filter turret 70 is operated to bring the filter arm 83 into the vertical path of travel. Then, the drum shield plug P is lowered onto the top of the filter arm 83 and the filter turret 70 is operated using the motors 81 and 81' to move the turret 70 to a neutral position clear of the vertical path of travel. The operations described above are accomplished prior to the operations illustrated in FIGS. 1 through 7.

At this point, the hoist mechanism 50 is operated using the drive motors 64 and 64' to lower the grab 55 into engagement with the stepped shield plug 19 over the filter pit 17, as shown in dashed lines in FIG. 1, and then to raise the shield plug 19 to the full up position shown in solid lines in FIG. 1. Then, the filter turret 70 is operated using the motors 91 and 91' to bring the plug arm 84 into the vertical path of travel, after which the grab 55 lowers the stepped shield plug 19 onto the plug arm 84, as shown in FIG. 2, and the turret is rotated to the neutral position.

At this point, the filter pit 17 is exposed and radiation therefrom creates a hazardous condition, making accurate and reliable operation of the filter removal machine A extremely important.

The hoist mechanism 50 is now operated to lower the grab 55 into the filter pit 17 and grasp the spent filter F', as shown in dashed lines in FIG. 3, raise it to a drip-dry position approximately two feet above the top of the filter pit 17, and hold it there for about 15 minutes. Then, the spent filter F' is raised to the full up position, as shown in solid lines in FIG. 3, and the drum table 30 is rotated to bring the drum into the vertical path, as shown in FIG. 4. Then, the spent filter F' is lowered into the prelined drum D, as shown in solid lines in FIG. 4, and the grab 55 is released and raised to its full up position. The drum table 30 is operated to move the drum D to a clearance position, and the filter turret 70 is operated to bring the filter arm 83 into the vertical path, after which the grab 55 is lowered, to grasp the drum shield plug P and raise it to its full up position.

Next, the filter turret 70 is turned to its neutral position, and the drum table 30 is operated to bring the drum D back into the vertical path, after which the hoist mechanism 50 is operated to lower the drum shield plug P into position in the drum. After the drum shield plug P is in place, the drum table 30 is operated to bring the loaded drum D into an operating position adjacent the drum capper assembly 100, as shown in FIG. 5.

At this point, the drum capping operation and the filter changing operation can proceed; however, for present purposes, the capping operation will be described first. With the drum D in position beneath the capping fixture 110, the motors 117 and 117' are operated to turn the lead screw 115 and lower the capping fixture 110 over the top of the drum D. This brings the lid L onto the rim of the open drum and also brings the clamping ring C into position surrounding the flange of the lid and the reinforced rim of the drum. Then the clamping assembly 130 is operated to bring the clamping ring C into a tightly clamped position around the flange of the lid L, and thus secure the lid to the drum.

While the drum capping operation is proceeding, the filter turret 70 is operated with the motors 81 and 81' to bring the filter arm 83 into the vertical path and the hoist mechanism 50 lowers the grab 55 into engagement with the new filter F, as shown in dashed lines in FIG. 5, and then raises it to the full up position, as shown in solid lines in FIG. 5. The filter turret 70 is then turned to its neutral position (FIG. 6) and the hoist mechanism 50 lowers the grab 55 and the new filter F into the filter pit 17, as shown in dashed lines in FIG. 6. After the grab 55 is released, it is again raised to the full up position and the filter turret is operated to bring the plug arm 84, and thus the stepped shield plug 19, into the vertical path.

Figure 7:
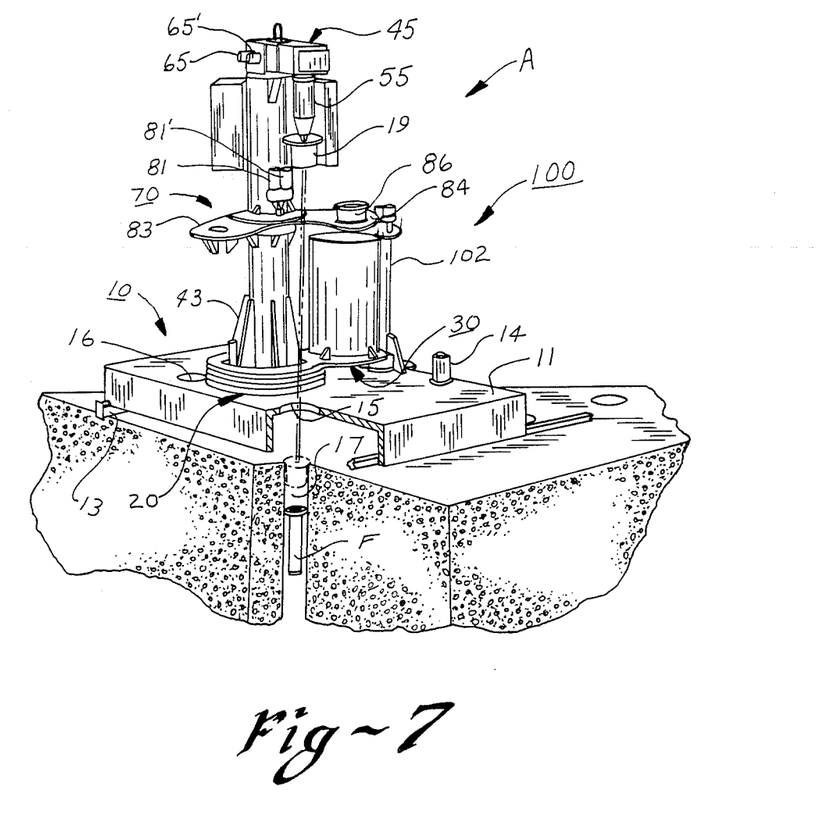

The hoist mechanism 50 is then operated to lower the grab 55 into engagement with the stepped shield plug 19 and to raise the plug to the full up position shown in solid lines in FIG. 7. The filter turret 70 is again returned to the neutral position (FIG. 7) and the hoist mechanism 50 lowers the grab 55 and the stepped shield plug 19 onto the top of the filter pit as shown in dashed lines in FIG. 7, after which the grab 55 is released and raised to the full up position.

The filter removal machine A is then propelled along the rails 13 to a position for unloading of the capped drum D, and, in the meantime, the drum table 30 has been operated to bring the drum D away from the drum capper assembly 100 to a position with vertical clearance to permit its removal. The drum D is removed using an overhead traveling gantry crane or the like, and then further processed for disposal.

While the invention has been shown and described with respect to a specific embodiment thereof, this is for the purpose of illustration rather than limitation, and other variations and modifications of the specific method and apparatus herein shown and described will be apparent to those skilled in the art, all within the intended spirit and scope of the invention. Accordingly, the patent is not to be limited in scope and effect to the specific embodiments herein shown and described, nor any other way that is inconsistent with the extent to which the progress in the art has been advanced by the invention.

What is claimed is:

1. Remotely controlled apparatus for removing filters from and replacing filters in a filter recess comprising:
    a base adapted to be located adjacent said recess;
    hoist means mounted on said base and including:
      a generally vertical mast,
      a generally horizontal boom extending outwardly from the top of said mast,
      grab means for engaging loads including filters to be transported to and from said filter recess,
      means for operating said grab means from a remote location,
      lift means for supporting said grab means from said boom, and for raising and lowering said grab means in a vertical path, and
      means for operating said lift means from a remote location;
    a drum table mounted on said base for rotary movement relative to said base about a vertical axis spaced from said vertical path to and from a position wherein a storage drum carried thereby is placed in said vertical path;
    means for operating said drum table from a remote location;
    a turret mounted on said mast intermediate said base and said boom for horizontal movement about a vertical axis and having at least one radially extending arm adapted to be moved to and from a position aligned with said vertical path; and
    means for operating said turret from a remote location.

2. Apparatus as defined in claim 1 that further comprises a rigid platform on which said base is mounted, wheel means on said platform adapted to engage parallel rails on opposite sides of said filter recess, and drive means mounted on said platform and operatively associated with said wheel means for driving said platform along said rails.

3. Apparatus as defined in claim 2, and further comprising control means for positioning said platform at a predetermined position relative to a filter recess whereby said vertical path of said grab means may be accurately aligned with said recess.

4. Apparatus as defined in either of claims 2 and 3, wherein said base is mounted on said platform for rotary movement about said vertical axis and further comprising means for controlling rotary movement of said base from a remote location.

5. Apparatus as defined in claim 1, wherein said lift means comprises chain and sprocket means.

6. Apparatus as defined in claim 5, wherein said chain and sprocket means comprises a length of roller chain having one end thereof operatively connected to said grab means, a first sprocket journaled at the outer end of said boom and operatively associated with said roller chain, a second sprocket mounted at the inner end of said boom and operatively associated with said roller chain, and sprocket drive means operatively connected to one of said sprockets for moving said roller chain to raise and lower said grab means in said vertical path.

7. Apparatus as defined in claim 5, wherein a portion of said roller chain extends downwardly from said second sprocket parallel to said vertical axis, and means operatively connected to said portion of said roller chain for applying a counterbalancing load to said roller chain tending to counterbalance the force applied by said grab means and loads engaged by said grab means.

8. Apparatus as defined in claim 1, wherein said turret has two radially extending arms, one of said arms being adapted to support a replacement filter and to move said replacement filter through an arc about said vertical axis to and from position in alignment with said vertical path for engagement by said grab means.

9. Apparatus as defined in claim 8, wherein said filter recess is normally covered with a shield plug engageable by said grab means and wherein the other of said radially extending arms is adapted to receive said shield plug from said grab means to support said shield plug and to move in an arc about said vertical axis to and from a position in alignment with said grab means.

10. Apparatus as defined in either of claims 1, 2, 3, or 4, further including drum capping means adapted to receive a drum moved to a predetermined position relative thereto by said drum table, for securing a drum head to said drum.

* * * * *